US011791468B2

(12) United States Patent
Zimmerman et al.

(10) Patent No.: US 11,791,468 B2
(45) Date of Patent: Oct. 17, 2023

(54) SECONDARY LI ION BATTERY AND LI CAPACITOR ELECTRODE COMPOSITIONS

(71) Applicant: Henkel AG & Co. KGaA, Duesseldorf (DE)

(72) Inventors: John L. Zimmerman, Taylor, MI (US); John D. McGee, Troy, MI (US); Andrew M. Dahl, Wixom, MI (US); John J. Comoford, Royal Oak, MI (US); David R. McCormick, Clawson, MI (US); Gregory T. Donaldson, Sterling Heights, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 442 days.

(21) Appl. No.: 16/431,912

(22) Filed: Jun. 5, 2019

(65) Prior Publication Data

US 2019/0296360 A1    Sep. 26, 2019

Related U.S. Application Data

(63) Continuation of application No. PCT/US2016/066335, filed on Dec. 13, 2016.

(51) Int. Cl.
| | |
|---|---|
| *H01M 4/62* | (2006.01) |
| *H01G 11/50* | (2013.01) |
| *H01M 4/04* | (2006.01) |
| *H01M 4/139* | (2010.01) |
| *H01M 10/0525* | (2010.01) |
| *H01M 4/137* | (2010.01) |
| *H01M 4/1399* | (2010.01) |
| *H01M 4/131* | (2010.01) |
| *H01M 4/60* | (2006.01) |
| *H01M 4/02* | (2006.01) |

(52) U.S. Cl.
CPC ............ *H01M 4/628* (2013.01); *H01G 11/50* (2013.01); *H01M 4/0404* (2013.01); *H01M 4/131* (2013.01); *H01M 4/137* (2013.01); *H01M 4/139* (2013.01); *H01M 4/1399* (2013.01); *H01M 4/604* (2013.01); *H01M 4/622* (2013.01); *H01M 4/625* (2013.01); *H01M 10/0525* (2013.01); *H01M 2004/028* (2013.01)

(58) Field of Classification Search
CPC .... H01M 4/0404; H01M 4/131; H01M 4/136; H01M 4/137; H01M 4/139; H01M 4/1391; H01M 4/1397; H01M 4/1399; H01M 4/485; H01M 4/505; H01M 4/525; H01M 4/5825; H01M 4/604; H01M 4/622; H01M 4/623; H01M 4/625; H01M 4/628; H01M 2004/028; H01M 10/0525; Y02E 60/10

See application file for complete search history.

(56) References Cited

U.S. PATENT DOCUMENTS

| | | | | |
|---|---|---|---|---|
| 4,992,116 A | * | 2/1991 | Hallman | C23C 22/361 148/247 |
| 5,298,289 A | * | 3/1994 | Lindert | B05D 7/51 428/500 |
| 5,891,952 A | | 4/1999 | McCormick et al. | |
| 9,819,023 B2 | | 11/2017 | McGee et al. | |
| 2005/0142413 A1 | * | 6/2005 | Kimura | H01M 8/0213 429/492 |
| 2009/0258218 A1 | | 10/2009 | Sandford et al. | |
| 2010/0159321 A1 | | 6/2010 | Lee et al. | |
| 2010/0248027 A1 | | 9/2010 | Zhang et al. | |
| 2013/0323592 A1 | * | 12/2013 | Lee | H01M 4/13 429/217 |
| 2018/0090766 A1 | * | 3/2018 | Ohsawa | H01M 10/052 |

FOREIGN PATENT DOCUMENTS

| | | | |
|---|---|---|---|
| CN | 102569723 A | | 7/2012 |
| EP | 2455356 A1 | | 5/2012 |
| EP | 2728646 A1 | | 5/2014 |
| JP | S49053282 | * | 5/1974 |
| JP | S49053282 A | | 5/1974 |
| JP | S52004489 A | | 1/1977 |
| JP | H04214776 A | | 8/1992 |
| JP | H08305038 A | | 11/1996 |

(Continued)

OTHER PUBLICATIONS

Supplementary European Search Report for EP 16924188.2, dated Apr. 24, 2020.
Yang, et al, "Thermal Stability of LiPF6 Salt and Li-Ion Battery Electrolytes Containing LiPF6", Lawrence Berkeley National Laboratory, University of California, Berkeley, CA, 2006—Abstract and Main Content of Article.
International Search Report for PCT/US2016/066335 dated Aug. 24, 2017.
Wang, E., et al., "Stability of Lithium Ion Spinel Cells III. Improved Life of Charged Cells", Journal of The Electrochemical Society, 147 (11) 4023-4028 (2000), Copyright The Electrochemical Society, Inc.

*Primary Examiner* — Brittany L Raymond
(74) *Attorney, Agent, or Firm* — Mary K. Cameron

(57) ABSTRACT

An electrode material useful as a dry in place deposit comprising at least one metal chelating polymer; an active material capable of reversibly intercalating lithium ions; a plurality of electrical conductor particles; a binder polymer. The electrode material is formed into a slurry using a non-aqueous solvent. The metal chelating polymer may be a reaction product of a polyphenolic polymer; an aldehyde, a ketone, or mixtures thereof; and an amine. The electrode material slurry is deposited on a current collector and dried to form a positive electrode in a secondary lithium ion battery. The deposited electrode material has high flexibility, adhesion to the current collector, resistance to electrolyte damage, and low electrical resistance. The electrode material forms a superior positive electrode at a relatively low additional cost and with no increase in process complexity.

19 Claims, No Drawings

(56) References Cited

FOREIGN PATENT DOCUMENTS

| | | | |
|---|---|---|---|
| JP | H11121012 | * | 4/1999 |
| JP | H11121012 A | | 4/1999 |
| JP | 2000195553 A | | 7/2000 |
| JP | 2004342504 A | | 12/2004 |
| JP | 2012089411 A | | 5/2012 |
| JP | 2012169112 A | | 9/2012 |
| JP | 2016149195 A | | 8/2016 |
| JP | 2016207346 A | | 12/2016 |
| WO | 2005050762 A1 | | 6/2005 |
| WO | 2008061212 A2 | | 5/2008 |
| WO | 2011003033 A1 | | 1/2011 |
| WO | 2011006698 A1 | | 1/2011 |
| WO | 2011112992 A1 | | 9/2011 |
| WO | 2012045002 A1 | | 4/2012 |
| WO | 2012092210 A1 | | 7/2012 |
| WO | 2013092446 A1 | | 6/2013 |
| WO | WO 2016-158754 | * | 10/2016 |

* cited by examiner

SECONDARY LI ION BATTERY AND LI CAPACITOR ELECTRODE COMPOSITIONS

TECHNICAL FIELD

This invention relates generally to electrical energy storage devices containing non-aqueous electrolytes, such as secondary (i.e. rechargeable) lithium ion batteries, lithium ion capacitors and the like. More specifically, the invention provides positive electrodes having improved resistance to damage from electrolytes and acids in the electrolyte and improved adhesion of electrode material to the current collector of the electrode, for use in these devices. A method of making the positive electrode having fewer manufacturing steps, and compositions used in making the positive electrode are also provided.

BACKGROUND OF THE INVENTION

In a secondary lithium ion battery, the main components are a positive electrode, a negative electrode, generally a permeable separator positioned between the positive and negative electrodes, and a non-aqueous electrolyte solution. The electrodes, both positive and negative, include a current collector covered with a layer of electrode material. The electrode material typically contains an electrical conductor material and an active material which permits reversible intercalation of lithium ions into itself, in a binder. The electrode materials are typically prepared as a slurry that is applied to the current collector and then dried in place to form the layer of electrode material, i.e. the electrode layer, adhered to the current collector.

During use and recharging, the electrode layers of lithium ion batteries and the like, tend to expand and contract. During these cycles of expansion and contraction it is essential that the contact between the current collector and the active material in the electrode layer be maintained. The binders used to secure the electrode material to the current collector can help to maintain this contact, but performance is limited by binder features, e.g. flexibility. Thus there is a need for improved adhesion between the current collector and the electrode layer, rendering it resistant to delamination due to expansion and contraction in the device.

Also as lithium ion batteries are used, levels of HF and other acids in the electrolyte increase, eventually attacking the electrode layer, containing the active material, and the current collector, which can shorten useful life of the device. Thus a need remains for materials that prevent these acids from damaging the electrode layer and its connection to the current collector.

Finally, the above-described criteria, must be met by the electrodes and their materials over a range of high current drains and high temperatures.

Past solutions to these problems have included use of various binder materials, combinations of binders, higher levels of binders, use of a conductive primer pre-coat between the current collector and the electrode material to increase adhesion of binders to the current collectors. A multi-step application of electrode material as a slurry has also been used. US2010/0248027 has attempted to cast the electrode slurry in multiple steps, this is undesirable as it is more expensive and requires extra coating steps and drying steps making it economically unfeasible. A drawback of binders and conductive primers to date is that they are very expensive and thus the cost of their use can be a limiting factor. JP2004342504 describes a variety of approaches that have been attempted to mitigate the performance degradation caused by hydrofluoric acid, these are not generally not useful commercially as they use costly additives or cause other issues as described within JP2004342504. In addition, use of binders and primers still requires multiple processing steps. Thus there is a need for a solution that is more cost effective and efficient in terms of requiring fewer processing steps to achieve the desired end result.

SUMMARY OF THE INVENTION

It is an object of the invention to provide an electrode material, for forming an electrode layer on a current collector, which includes at least one metal chelating polymer. The metal chelating polymer provides at least one of the following benefits: increased adhesion of electrode material to a current collector; decrease electrical resistance of the electrode; increased chemical resistance of the layer of electrode material to attack by acids, e.g. HF; and increased flexibility of the layer of electrode material (electrode layer) attached to a current collector.

In one embodiment, the present invention comprises a non-aqueous electrode material for a lithium ion electrical storage device comprising: at least one metal chelating polymer comprising a reaction product of a polyphenolic polymer; an aldehyde, a ketone, or mixtures thereof; and an amine; wherein the metal chelating polymer is capable of chelating and binding to a metal; an active material capable of reversibly intercalating lithium ions; a plurality of electrical conductor particles; and a binder polymer.

In another embodiment, the present invention comprises an electrode for use as a positive electrode a lithium ion electrical storage device comprising: a current collector; and adhered to at least one surface of the current collector an electrode layer made up of an electrode material comprising: at least one metal chelating polymer comprising a reaction product of a polyphenolic polymer; an aldehyde, a ketone, or mixtures thereof; and an amine, the polymer capable of chelating and binding to a metal; an active material capable of reversibly intercalating lithium ions; a plurality of electrical conductor particles; and a binder polymer.

In yet another embodiment, the present invention comprises a non-aqueous electrode material intermediate for a lithium ion electrical storage device comprising: at least one metal chelating polymer comprising a reaction product of a polyphenolic polymer; an aldehyde, a ketone, or mixtures thereof; and an amine, the metal chelating polymer capable of chelating and binding to a metal; a plurality of electrical conductor particles; and a binder polymer.

Other than in the operating examples, or where otherwise indicated, all numbers expressing quantities of ingredients, reaction conditions, or defining ingredient parameters used herein are to be understood as modified in all instances by the term "about". Throughout the description, unless expressly stated to the contrary: percent, "parts of", and ratio values are by weight or mass; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description or of generation in situ within the composition by chemical reaction(s) between one or more newly added constituents and one or more constituents already present in the composition when the other constituents are added; specification of constituents in ionic form additionally implies the presence of sufficient counterions to produce electrical neutrality for the composition as a whole and for any substance added to the composition; any counterions thus implicitly specified preferably are selected from among other constituents explicitly specified in ionic form, to the extent possible; otherwise, such counterions may be freely selected, except for avoiding counterions that act adversely to an object of the invention; molecular weight (MW) is weight average molecular weight; the word "mole" means "gram mole", and the word itself and all of its grammatical variations may be used for any chemical species defined by all of the types and numbers of atoms present in it, irrespective of whether the species is ionic, neutral, unstable, hypothetical or in fact a stable neutral substance with well-defined molecules.

As used herein, the term "positive electrode" will be understood by those of skill in the art to mean an article of manufacture intended for use as a positive electrode in an electrical energy storage device, e.g. a lithium ion battery or the like. The article need not be part of an assembled device and functioning as the positive electrode of the device. The article may be a finished good or part thereof or may be an intermediate made during manufacture of an electrical energy storage device.

For a variety of reasons, it is preferred that electrode material intermediate, the electrode material and the electrode layer according to the invention may be substantially free from many ingredients used in compositions for similar purposes in the prior art. Specifically, it is increasingly preferred in the order given, independently for each preferably minimized ingredient listed below, that the positive electrode, the electrode material, the electrode material intermediate, according to the invention, contain no more than 1.0, 0.5, 0.35, 0.10, 0.08, 0.04, 0.02, 0.01, 0.001, or 0.0002 percent, more preferably said numerical values in grams per liter, of each of the following constituents: water; Brønsted-Lowry acid compounds; sodium ions and lead.

In the present specification and claims when a value range is reported for a parameter the value range is understood to include all values between the cited range values. All percentage values are based on the weights as defined in the specification, generally on the basis of the total dried electrode material weight and not based on the total electrode weight or the weight in a slurry.

These and other features and advantages of this invention will become more apparent to those skilled in the art from the detailed description of a preferred embodiment.

DETAILED DESCRIPTION OF A PREFERRED EMBODIMENT

The present invention is directed toward creation of enhanced electrodes for use in secondary lithium ion batteries and other electrical energy storage devices utilizing lithium ion chemistries. In the present specification the emphasis is on testing of electrodes usable in lithium ion batteries; however these same inventive attributes are equally applicable to other devices, such as lithium ion capacitors and the like. The invention presents an electrode material useful in a positive electrode of a lithium ion battery and methods of making the electrode material intermediate, an electrode layer comprising electrode material and positive electrodes. The inventive electrodes have better structural integrity, lowered electrical resistance, enhanced endurance against attack from HF in electrolyte solutions, and the electrode material has increased flexibility and better adhesion to current collectors such that if better withstands expansion and contraction cycles thereby reducing separation of the electrode layer from the current collector.

As described above, secondary lithium ion batteries have three main components: a positive electrode, a negative electrode and a non-aqueous electrolyte solution in contact with the electrodes. Most also include some form of separator sheet placed between the positive and negative electrodes. The electrodes, both positive and negative, include a current collector covered with adherent electrode material.

The current collector can be in the structural form of a mesh, a foam, a foil, a rod, or another morphology that does not interfere with current collector function. Current collector materials vary depending on whether an electrode is a positive electrode or a negative electrode. The most common current collectors for a negative electrode are sheets or foils of copper)($Cu^0$) or nickel)($Ni^0$) metal. The current collector material for a positive electrode according to the invention can be aluminum containing material, such as a porous body and may desirably be aluminum)($Al^0$). It can be in any of the structural forms described above. It is the metal containing surfaces of the current collector upon which the electrode material is applied and to which it must adhere.

Electrode materials according to the invention produce electrode layers that have improved adhesion to metal surfaces, in particular aluminum containing surfaces of the current collector for a positive electrode.

The electrode material may contain an active material, which permits reversible intercalation of lithium ions into itself; an electrical conductor material to help move electrical current between the active material and the current collector; and one or more binders to bind the electrode material onto the current collector to form an electrode layer.

Secondary lithium ion batteries are rechargeable by virtue of lithium ions' ability to travel through the electrolyte and reversibly intercalate into active material of the positive and negative electrodes. In a secondary battery, lithium ions flow in a first direction between the positive and negative electrodes when the battery is charging and flow in the opposite direction (second direction) when the battery is discharging. Positive and negative electrodes of a secondary battery retain these structural designations regardless of current flow, but are alternately anodes or cathodes depending on whether the battery is charging or discharging. By definition a cathode of a device is the electrode from which current flows out of the device and the anode is the electrode where the current flows into the device from outside, as such when the battery is discharging, the positive electrode is the cathode and when the battery is charging, the positive electrode is the anode. The lithium ions, which always move from anode to cathode, move through the electrolyte and reversibly intercalate into active material of the negative electrode or the positive electrode depending on whether the secondary battery is discharging or charging.

The lithium ions intercalation into the active material of the electrodes can lead to significant swelling and shrinking of the electrode material as the lithium ions move in and out of the electrode's active material; for some materials the size shift can be 400%. During these cycles of expansion and contraction it is essential that the interface between the current collector and the active material remain intact to avoid premature failure of the device. Desirably, the interface shows less than in increasing order of preference, about 90, 80, 70, 60, 50, 40, 30, 20, 10, 5 or 1% loss of adhesion between the electrode material and the current collector.

The acids that form over time in the electrolyte can interfere with adhesion between the current collector and the electrode material in the electrode. Binders included in the electrode material help maintain contact between the current collector and the active material and electrical conductor material, however they have a high cost and are not effective in all electrolytes. The binder can be present in electrode materials according to the invention at levels of from at least about 1, 2, 3, 4, 5, 6, 7, 8, 9, 10, 11, 12, 13, 14, 15, 16, 17, 18, 19 or 20% by weight and not more than, in increasing order of preference, about 40, 39, 38, 37, 36, 35, 34, 33, 32, 31, 30, 29, 28, 27, 26, 25, 24, 23, 22 or 21% by weight based on the dried weight of the electrode material, desirably binder amounts may range from 1 to 20% by weight, and preferably from 1 to 10% by weight. One binder useful in forming electrodes according to the invention for lithium ion batteries is polyvinylidene difluoride. Polyvinylidene difluoride (PVDF) is a non-reactive and thermoplastic fluoropolymer formed from polymerization of the monomer vinylidene difluoride. Other binders that find use in formation of electrodes according to the present invention include poly(methyl methacrylate) (PMMA), polyacrylonitrile (PAN), styrene butadiene rubber (SBR), polytetrafluoroethylene (PTFE), styrene butadiene rubber (SBR) and polytetrafluoroethylene (PTFE) copolymers, carboxymethyl cellulose (CMC), hydroxylpropyl methyl cellulose (HPMC), methyl cellulose (MC), and polyacrylic acid sodium (PAAS).

Generally the binder is added to a solvent and this is then combined with the active lithium storage material (i.e. active material) such as graphite, $LiCoO_2$, $LiMn_2O_4$, $LiNiMnCoO_2$, $LiNiCoAlO_2$, $Li_4Ti_5O_{12}$, $Li_2BaTi_6O_{14}$, $LiCrP_2O_7/C$ or $LiFePO_4$ and a conductive additive such as carbon black, graphite, graphene or carbon nanofibers to form an electrode slurry. The slurry is then deposited onto a current collector such as copper or aluminum. Slurries can be deposited by any known means in the art including by spraying, rolling, draw bar application, bird bar application, gravure, slot coating, and other coil coating methods. The slurry is dried, optionally calendered, to remove all of the residual solvent and any water, therefore the drying times, temperatures, and any vacuum used can be adjusted to achieve this end result. The electrode slurry is dried to bind it to the current collector forming an electrode material, generally an electrode layer, adhered to the current collector, thereby forming a positive electrode.

Total dried coating weight of the electrode material may range from at least about, in increasing order of preference, 40, 45, 50, 55, 60, 65, 70, 75, 80, 85, 90, 95, 100, 110, 120, 130, 140 or 150 g/m$^2$ total dried weight, and not more than, in increasing order of preference, about 300, 275, 250, 225, 200, 175, 170 or 160 g/m$^2$ total dried weight, preferably is from 50 to 250, more preferably from 100 to 175 g/m$^2$ total dried weight. The electrode slurry is preferably applied to at least one surface of the current collector; however it can be applied to as many surfaces as desired.

The most common solvent used to prepare electrode slurries is N-methyl-2-pyrrolidone (NMP), which is suitable for use in the invention. Other solvents that find use in the present invention include N, N dimethylformamide (DMF), N, N diethylformamide (DEF), dimethyl sulfoxide (DMSO), tetrahydrofuran (THF), and certain alcohols.

Suitable active material in positive electrodes is generally some form of a metal oxide. Desirably active materials for the positive electrodes according to the invention comprise spinels of manganese, e.g. lithium manganese oxide; metal oxides; or polyanions, e.g. lithium iron phosphate. The metal oxide can be a layered oxide like a lithium cobalt oxide. In some embodiments, the positive electrode can have a mix of active materials such as transition metal oxides, layered metal oxides and the like. Suitable forms of active materials include $LiCoO_2$, $LiMn_2O_4$, $LiFePO_4$, $LiNi_xMn_yCo_zO_2$, and $LiNiCoAlO_2$ and the like. Any material into which lithium ions are able to reversibly intercalate may be a suitable active material according to the invention, provided that the material does not unduly interfere with the benefits of the invention. The typical active material for negative electrodes is either graphite or graphene with the electrical conductive material being carbon black. Graphite permits reversible intercalation of the lithium ions into itself with high efficiency. In lithium ion secondary batteries the most popular commercial negative electrode active material is graphite. Other active materials that have been used instead of graphite include $Li_4Ti_5O_{12}$ which forms a spinel, hard carbons, tin/cobalt alloys and silicon/carbon materials.

Suitable materials for electrical conductor materials in electrode material and electrode material intermediates according to the invention comprise at least one of carbon black, graphite, graphene, and carbon nanoparticles. In one embodiment, the electrical conductor material for a positive electrode is carbon black. The electrical conductor material may have a particle size of from 0.001 to 50 microns in diameter, desirably the particle size may be about 0.002, 0.01, 0.05, 0.1, 0.5, 1, 2, 3, 4, 5, 6, 7, 8, 9, 10, 11, 12 or 13 microns, and not more than, in increasing order of preference, about 45, 40, 35, 30, 29, 28, 27, 26, 25, 24, 23, 22, 21, 20, 19, 18, 17, 16 or 15 microns. In certain embodiments, the electrical conductor particles may have a non-spherical shape and may have a shape such as platelet shapes, sheets, nanoplatelets, nanofibers, nanorods, nanotubes, and other shapes. These other shapes may have thicknesses of from 0.34, 0.5, 1, 2, 3, 4, 5, 6, 7, 8, 9, 10, 11, 12, 13, 14, 15, 16, 17, 18, 19, 20 nanometers, and not more than, in increasing order of preference, about 100, 95, 90, 85, 80, 75, 70, 65, 60, 55, 50, 45, 40, 39, 38, 37, 36, 35, 34, 33, 32, 31, 30, 29, 28, 27, 26, 25, 24, 23, 22 or 21 nanometers (nm) and length/widths of 0.5, 1, 2, 3, 4, 5, 6, 7, 8, 9, 10, 11, 12 or 13 microns, and not more than, in increasing order of preference, about 50, 40, 30, 29, 28, 27, 26, 25, 24, 23, 22, 21, 20, 19, 18, 17, 16 or 15 microns. Any electrically conductive material may be a suitable electrical conductor material according to the invention, provided that the material does not unduly interfere with the benefits of the invention.

Electrolytes suitable for use in lithium ion electrical devices are aprotic electrolytes comprising an organic liquid, containing less than 20 ppm of water, and lithium ion complexes. Preferably the water is kept to less than 100 ppm, and most preferably less than 20 ppm to reduce formation of HF in the electrolyte. Examples of electrolyte organic solvent or carrier finding use in the present invention include organic carbonates such as dimethyl carbonate, ethylene carbonate, diethyl carbonate, methylethyl carbonate, fluorinated carbonate, cyclic esters, linear esters, cyclic ethers, and linear ethers. The lithium ion complexes in the electrolyte of the present invention can comprise one or more of $LiPF_6$, $LiAsF_6$, $LiClO_4$, $LiBF_4$, $LiCF_3SO_3$, $LiCl$, $LiBr$, $LiB(C_6H_5)_4$, $LiN(SO_2CF_3)_2$, $LiC(SO_2CF_3)_3$, $LiOSO_2C_2F_5$, $LiOSO_2C_3F_7$, $LiOSO_2C_4F_9$, $LiOSO_2C_5F_{11}$, $LiOSO_2C_6F_{13}$, and $LiOSO_2C_7F_{15}$. As known in the art, many such electrolytes in the presence of other battery constituents can often be subject to chemical degradation pathways which often occur more readily at elevated temperatures including those typical of in service operation. Byproducts which can be produced include HF, which can compromise adhesion of polymeric coatings over aluminum. See, for example, "Thermal Stability of $LiPF_6$ Salt and Li-ion Battery Electrolytes Containing $LiPF_6$", Yang et. al, Lawrence Berkeley National Laboratory, 2006, a review of the thermo-degradation of common lithium ion battery electrolyte at elevated storage temperature of 358° K.

The present invention is directed to a novel electrode material that provides the desired increased adhesion of the electrode material to the current collector, resistance to attack by HF, increased flexibility of the electrode, and decreased electrical resistance. Electrode material according to the present invention does not require high levels of binder material, a conductive primer layer, or multiple application steps of slurry material. It is an electrode material designed for deposit on a positive electrode.

In the present invention it has been found that metal chelating polymers of a specific class form very effective compositions for binding positive electrode materials to positive current collectors. These metal chelating polymers are preferably Mannich reaction products and are formed from reaction of: a polyphenolic polymer; an aldehyde, ketone, or mixture thereof; and an amine. Throughout the present specification and claims the polymers according to the present invention are referred to as metal chelating polymers. They find special use with current collectors comprising aluminum. The present metal chelating polymers are formed as described in U.S. Pat. No. 5,891,952. U.S. Pat. No. 5,891,952 (the '952 patent) is hereby incorporated in its entirety into the present invention specification. The metal chelating polymers used in the present invention were initially developed as aqueous surface coating materials in an attempt to move from surface coating materials that typically required organic carrier materials. The aqueous coating compositions of the '952 patent found use as coating compositions that were aqueous and had a lower volatile organic compound value. The present inventors have found an unexpected non-aqueous use for these metal chelating polymers, namely, incorporation into non-aqueous electrode materials and electrode intermediates used to make electrode layers, thereby increasing adhesion of a diverse array of materials to current collectors in a highly effective manner at very low levels of the metal chelating polymers.

In one embodiment, electrode materials according to the invention comprise at least one metal chelating polymer comprising a reaction product of a polyphenolic polymer; an aldehyde, a ketone, or mixtures thereof; and an amine, said metal chelating polymer capable of chelating and binding to a metal; an active material capable of reversibly intercalating lithium ions; a plurality of electrical conductor particles; and a binder polymer.

In one embodiment, an electrode material intermediate according to the invention is made in the absence of an active material, as described above, and comprises at least one metal chelating polymer comprising a reaction product of a polyphenolic polymer; an aldehyde, a ketone, or mixtures thereof; and an amine, said metal chelating polymer capable of chelating and binding to a metal; a plurality of electrical conductor particles; and a binder polymer.

The electrode material and electrode material intermediates of the invention may also include small amounts of crosslink catalysts for the binder polymers, biocides, wetting agents, and dispersing agents.

The metal chelating polymers produced by the process of the invention are the reaction products of: component A, which is at least one phenolic polymer or copolymer; component B, which is an aldehyde, a ketone, or mixture thereof; and a component C which is at least one amine. At least one of the polymers thus formed is capable of chelating and binding to a metal. Preferably the reaction proceeds by a Mannich reaction process. The process produces a variety of polymer products as is known in the art of polymer chemistry and at least one or more of the produced polymers are a metal chelating polymer. Preferably, the metal chelating polymers are especially effective at binding and chelating aluminum and aluminum containing metals.

A process of making a metal chelating polymer for use in electrode material according to the invention comprises the following steps: step I) reacting the phenolic polymer or copolymer component A in water with an organic or inorganic base to form the corresponding phenoxide salt at a temperature of from 20 to 50° C.; step II) reacting the aqueous solution from step I) with an amine component C, which is preferably a secondary amine, and component B the aldehyde, ketone, or mixture thereof at a temperature in the range of from 20° to 100° C., preferably from 50° to 80° C.; optional step III) of adding an acid to neutralize the base and to react with the amine functionality in the product to solubilize the product; and step IV) passing the resulting aqueous solution from step III) through an acid cation exchange column ($H^+$ form) to remove base ions, such as sodium ions. If it is desired to also remove unreacted secondary amine as well, a strong acid cation exchange column is used. If it is desired to remove only base ions, a weak acid cation exchange column is used. Prior to use in the present invention the aqueous solution of the metal chelating polymer is dried to a powder form to remove all the water. This step is necessary and converts the aqueous solution of the '952 patent to a powdered polymer for use in the present invention. The quantities of components A, B, and C used to prepare the polyphenol polymer product in an aqueous solution are generally from at least about 0.25, 0.3, 0.4, 0.5, 0.6, 0.7, 0.8, 0.9, or 1.0, and not more than, in increasing order of preference, about 1.1, 1.2, 1.3, 1.4, 1.5, 1.6, 1.7, 1.8, 1.9, 2.0, 2.2, 2.4 or 2.5 molecular equivalents of component B, and from at least about 0.25, 0.3, 0.4, 0.5, 0.6, 0.7, 0.8, 0.9, or 1.0, and not more than, in increasing order of preference, about 1.1, 1.2, 1.3, 1.4, 1.5, 1.6, 1.7, 1.8, 1.9, 2.0, 2.2, 2.4 or 2.5 molecular equivalents of component C, all based on 1 molecular equivalent of component A. The absolute quantities of these components are selected to provide an aqueous solution from step IV) that contains from at least, in increasing order of preference, about 1, 2, 3, 4, 5, 6, 7, 8, 9, 10, 11, 12, 13, 14, 15, 16, 17, 18, 19 or 20% by weight and not more than, in increasing order of preference, about 55, 54, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22 or 21% by weight of solids in the solution based on a total weight of the solution. Desirably the solids ranges from 5 to 50% by weight, preferably from 15 to 35% by weight.

In step I) the organic or inorganic base may be an alkali metal hydroxide, e.g. sodium or potassium hydroxide, although tetraalkylammonium hydroxides, e.g. tetrabutylammonium hydroxide, or tetraarylammonium hydroxides can also be used. The base may be present in amounts of at least, in increasing order of preference, about 5, 6, 7, 8, 9, 10, 11, 12, 13, 14, 15, 16, 17, 18, 19, 20, 21, 22, 23, 24, 25, 26, 27, 28, 29 or 30 mole %, and not more than, in increasing order of preference, about 55, 54, 53, 52, 51, 50, 49, 48, 47, 46, 45, 44, 43, 42, or 40 mole %, based on the moles of phenolic polymer or copolymer, desirably at least 10 mole % and preferably at least 25 mole %, based on the moles of phenolic polymer or copolymer. Step I) is preferably carried out at a temperature in the range of from 20° to 50° C., more preferably from 20° to 25° C. When needed, step III) uses an acid to neutralize the base. It can be an organic or an inorganic acid. Useful and preferred acids for this purpose include carbonic acid, acetic acid, citric acid, oxalic acid, ascorbic acid, phenylphosphonic acid, chloromethylphosphonic acid; mono, di and trichloroacetic acid, trifluoroacetic acid, nitric acid, phosphoric acid, hydrofluoric acid, sulfuric acid, boric acid, hydrochloric acid, and the like; these may be employed alone or in combination with each other. In step IV), strong acid cation exchange columns are those of the sulfonic acid or phosphonic acid types. Weak acid cation exchange columns are those of the carboxylic acid type.

The molecular weight of component A can be in a range of about 360 to 30,000 or greater. In one embodiment, component A is a poly (4-vinylphenol) having a molecular weight of from 2500 to 10,000, preferably about 5,000 to about 7500. Especially preferred for component A is 4-hydroxystyrene. The term "copolymer" used herein includes polymers, such as terpolymers, made up of two or more monomer components. Component A, i.e. the phenolic polymer or copolymer, may be selected from polymeric compounds (a) to (d) as described below.

Component A can be (a) a polymer material having at least one unit having the formula I:

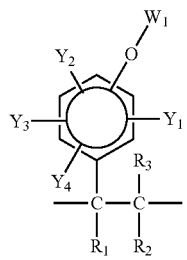

wherein $R_1$ through $R_3$ are independently selected for each of said units from the group consisting of hydrogen, an alkyl group having from 1 to about 5 carbon atoms, or an aryl group having about 6 to about 18 carbon atoms; $Y_1$ through $Y_4$ are independently selected for each of said units from the group consisting of hydrogen, or an alkyl or aryl group having from 1 to 18 carbon atoms; and $W_1$ is independently selected for each of said units from hydrogen or a hydrolyzable group such as an acyl group, e.g. acetyl, benzoyl, and the like, hydrogen is preferred.

Component A can be (b) a polymer material having at least one unit having the formula II:

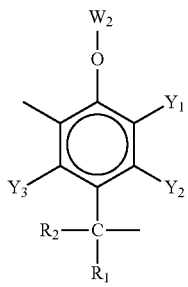

wherein $R_1$ through $R_2$ are independently selected for each of said units from the group consisting of hydrogen, an alkyl group having from 1 to about 5 carbon atoms, or an aryl group having from about 6 to about 18 carbon atoms; $Y_1$ through $Y_3$ are independently selected for each of said units from the group consisting of hydrogen or an alkyl or aryl group having from 1 to 18 carbon atoms; and $W_1$ is independently selected for each of said units from hydrogen or a hydrolyzable group such as an acyl group, e.g. acetyl, benzoyl, and the like, hydrogen is preferred.

Component A can be (c) a copolymer material wherein at least one portion of said co-polymer has a structure corresponding to formula III:

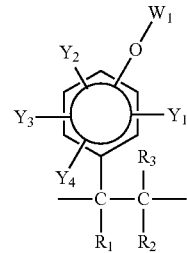

wherein $R_1$ through $R_3$; $Y_1$ through $Y_4$; and $W_1$ are defined as in Formula I, and at least a fraction of said portion is polymerized with one or more monomers having a C=C double bonded moiety. Useful monomers having a C=C double bonded moiety include those independently selected for each of said units from the group consisting of acrylonitrile, methacrylonitrile, methyl acrylate, methyl methacrylate, vinyl acetate, vinyl methyl ketone, isopropenyl methyl ketone, acrylic acid, methacrylic acid, acrylamide, methacrylamide, n-amyl methacrylate, styrene, m-bromostyrene, p-bromostyrene, pyridine, diallyldimethylammonium salts, 1,3-butadiene, n-butyl acrylate, tert-butylamino-ethyl methacrylate, n-butyl methacrylate, tert-butyl methacrylate, n-butyl vinyl ether, tert-butyl vinyl ether, m-chlorostyrene, o-chlorostyrene, p-chlorostyrene, n-decyl methacrylate, N,N-diallylmelamine, N,N-di-n-butylacrylamide, di-n-butyl itaconate, di-n-butyl maleate, diethylaminoethyl methacrylate, diethyleneglycol monovinyl ether, diethyl fumarate, diethyl itaconate, diethyl vinylphosphonate, vinylphosphonic acid, diisobutyl maleate, diisopropyl itaconate, diisopropyl maleate, dimethyl fumarate, dimethyl itaconate, dimethyl maleate, di-n-nonyl fumarate, di-n-nonyl maleate, dioctyl fumarate, di-n-octyl itaconate, di-n-propyl itaconate, n-dodecyl vinyl ether, ethyl acid fumarate, ethyl acid maleate, ethyl acrylate, ethyl cinnamate, N-ethylmethacrylamide, ethyl methacrylate, ethyl vinyl ether, 5-ethyl-2-vinylpyridine, 5-ethyl-2-vinylpyridine-1-oxide, glycidyl acrylate, glycidyl methacrylate, n-hexyl methacrylate, 2-hydroxyethyl methacrylate, 2-hydroxypropyl methacrylate, isobutyl methacrylate, isobutyl vinyl ether, isoprene, isopropyl methacrylate, isopropyl vinyl ether, itaconic acid, lauryl methacrylate, methacrylamide, methacrylic acid, methacrylonitrile, N-methylolacrylamide, N-methylolmethacrylamide, N-isobutoxymethylacrylamide, N-isobutoxymethylmethacrylamide, N-alkyloxymethylacrylamide, N-alkyloxymethylmethacrylamide, N-vinyl-caprolactam, methyl acrylate, N-methylmethacrylamide, .alpha.-methyl styrene, m-methyl styrene, o-methyl styrene, p-methylstyrene, 2-methyl-5-vinylpyridine, n-propyl methacrylate, sodium p-styrenesulfonate, stearyl methacrylate, styrene, p-styrene-sulfonic acid, p-styrenesulfonamide, vinyl bromide, 9-vinylcarbazole, vinyl chloride, vinylidene chloride, 1-vinylnaphthalene, 2-vinylnaphthalene, 2-vinylpyridine, 4-vinylpyridine, 2-vinylpyridine N-oxide, 4-vinylpyrimidine, N-vinylpyrrolidone; and $W_1$, $Y_1$ to $Y_4$ and $R_1$ to $R_3$ are as in polymer material (a), above. Within such materials, the ratio of any single monomer to any other monomer can be about 1:99 to about 99:1, preferably about 5:1 to about 1:5, and more preferably 1.5:1 to about 1:1.5.

Component A can be (d) a condensation polymer, i.e. wherein any of polymeric materials (a), (b) or (c) is condensed with a second compound selected from the group consisting of phenols (preferably phenol, alkylphenol, arylphenol, cresol, resorcinol, catechol, pyrogallol), tannins, (both hydrolyzable and condensed) novolak resins, lignin compounds, together with aldehydes, ketones or mixtures thereof, to produce a condensation resin product.

Component B is preferably an aldehyde, and most preferably it is formaldehyde, especially in the form of paraformaldehyde. Formaldehyde is generally commercially available in a form that contains a significant quantity of methanol, e.g. 15% methanol. Since the present polymer formation process is carried out in the absence of organic solvents, formaldehyde free from methanol preferably is used, such as uninhibited aqueous formaldehyde. Paraformaldehyde is also a convenient form of formaldehyde that does not contain any alcohol component.

Component C is an amine, preferably a secondary amine, e.g. methylethylamine, dimethylamine, diethylamine, diethanolamine, methyl ethanolamine, dipropylamine, di-n-butylamine, diisoamylamine, dibenzylamine, methyldiethylenediamine, methylaniline, piperidine, 1,2,3,4-tetrahydroisoquinoline, 6-methoxy-1,2,3,4-tetrahydroisoquinoline, morpholine, piperazine, α-methylaminopropiophenone, α-acetylethylbenzylamine; benzyl-(2-cyclohexanonylmethyl)-amine, 3,4-methylenedioxybenzyl-(2-cyclohexanonylmethyl)-amine, N-methyl-glucamine, glucosamine, and t-butylamine; or mixtures thereof. Primary amines can also be used, such as $C_1$ to $C_{12}$ alkyl amines and the like.

In preparing electrode materials according to the present invention, the metal chelating polymers may be included in amounts of from, in increasing order of preference about 0.05, 0.1, 0.2, 0.3, 0.4, 0.5, 0.7, 0.8, 1, 1.3, 1.5, 1.7, 2.0, 2.1, 2.3, 2.5, 2.7, 2.9, 3.0, 3.1, 3.3, 3.5, 3.7, 3.9, 4.0, 4.1, 4.3, 4.5, 4.7, 4.9, 5, 5.5, 6, 6.5, 7, 7.5, 8, 8.5 or 9% by weight, and not more than, in increasing order of preference, about 20, 19, 18, 17, 16, 15, 14, 13, 12, 11, 10% by weight, preferably the metal chelating polymers are included in the electrode materials at a level of from 0.1 to 15% by weight based on the total dried electrode material weight.

In preparing an electrode material intermediate, i.e. without an active material, according to the present invention, the metal chelating polymers may be included in amounts of from, in increasing order of preference about 0.05, 0.1, 0.2, 0.3, 0.4, 0.5, 0.7, 0.8, 1, 1.3, 1.5, 1.7, 2.0, 2.1, 2.3, 2.5, 2.7, 2.9, 3.0, 3.1, 3.3, 3.5, 3.7, 3.9, 4.0, 4.1, 4.3, 4.5, 4.7, 4.9, 5, 5.5, 6, 6.5, 7, 7.5, 8, 8.5 or 9% by weight, and not more than, in increasing order of preference, about 25, 24, 23, 22, 21, 20, 19, 18, 17, 16, 15, 14, 13, 12, 11, 10% by weight, preferably the metal chelating polymers are included in the electrode material intermediates in an amount of from 0.1 to 25% by weight based on the total dried electrode material weight.

Electrode material compositions containing positive electrode active material according to the present invention may have the compositions recited below in Table 1.

TABLE 1

| Component | Weight % based on total dried weight | Preferred weight % based on total dried weight |
| --- | --- | --- |
| Metal chelating polymer | 0.1-15 | 0.5-5 |
| Electrical conductor material | 1-40 | 1-15 |
| Positive electrode active material | 9-97.9 | 80-97.5 |
| Binder material | 1-40 | 1-15 |
| Total | 100 | 100 |

In another embodiment, the present invention comprises an electrode material intermediate that does not include a positive electrode active material and that may a composition as recited in Table 2 below.

TABLE 2

| Component | Weight % based on total dried weight | Preferred weight % based on total dried weight |
| --- | --- | --- |
| Metal chelating polymer | 0.1-25 | 1-15 |
| Electrical conductor material | 50-90 | 65-75 |
| Binder material | 5-25 | 17-25 |
| Total | 100 | 100 |

Both of the electrode material compositions of Tables 1 and 2 can also include a small, but effective, amount of one or more of crosslink catalysts for the binder polymers, biocides, wetting agents, and dispersing agents.

As discussed the metal chelating polymers are preferably Mannich reaction polymers. The metal chelator functionality of the polymers provides chelating adhesion to aluminum current collectors. These chelating polymers also aid in bonding of the active materials and any other additives to the current collector. Specific chelating groups also provide corrosion resistance in high HF containing electrolytes as shown below.

EXAMPLES

Electrode Material Examples

Example A

In a first series of experiments the present invention was demonstrated as follows. Test positive electrodes were prepared using the three slurries described below in Table 3. To prepare all of the electrode slurries the solvent N-methyl-2-pyrrolidone (NMP) was used. Example $C_1$ was a control sample using standard preparation binders and other components in the electrode slurry. Example $K_1$ was prepared using an example inventive metal chelating polymer K. Polymer K was prepared using as component A poly(4-hydroxystyrene), paraformaldehyde as component B, and as component C the amine N-methyl-D-glucamine. Example $G_1$ was prepared using another example inventive metal chelating polymer G. Polymer G was prepared using as component A poly(4-hydroxystyrene), paraformaldehyde as component B, and as component C the amine N-methyl-ethanolamine.

The examples were prepared by adding them to a sample cup with a lid in a dry atmosphere glove bag in the order listed. The solvent used in all examples was N-methyl-2-pyrrolidone (NMP), which is a standard solvent in the industry. The carbon black was Vulcan XC72R from Cabot Corporation Edison N.J. It had a mean particle size by Stokes diameter of 30 nanometers (nm) and 80% of the particles fell in the range of from 8 to 60 nm in diameter. Preferably the electrical conductor material has a particle size of from 0.001 to 50 microns in diameter. In certain examples the electrical conductor particles may have a non-spherical shape and may have a shape such as platelet shapes, sheets, nanoplatelets, nanofibers, nanorods, nanotubes, and other shapes. These other shapes may have thicknesses of from 0.34 to 100 nanometers (nm) and length/widths of 0.5 to 25 microns.

For all examples, all components other than the active material were combined in the order in which listed in the Table and pre-mixed in a planetary mixer using the following schedule: 20 seconds at 1300 rpm, 10 seconds at 2000 rpm, 10 seconds at 1700 rpm, 10 seconds at 1500 rpm, and 10 seconds at 1400 rpm. Mixing without active material allowed thorough mixing of the other components, since the active material can significantly increase viscosity of the composition. The sealed cups were returned to the bag and mixing continued with addition of the active material and mixing at 2000 rpm for 3 minutes to form a slurry.

TABLE 3

| Component(grams) | Comparative Example $C_1$ | Example $G_1$ | Example $K_1$ |
|---|---|---|---|
| Solvent (NMP) | 58.0 | 39.2 | 39.2 |
| Metal chelating polymer | 0.0 | 1.3 | 1.3 |
| PVDF binder | 3.4 | 3.6 | 3.6 |
| Electrical conductive material carbon black | 3.4 | 5.0 | 5.0 |
| Active material ($LiMn_2O_4$) | 35.2 | 50.9 | 50.9 |

Each example slurry from Table 3 was then applied to pre-clean aluminum foil using a bird bar applicator having a gap width of 5 or 7.5 mils to result in a deposited weight after drying of from 110 to 130 grams/meter$^2$ dried weight. The samples were then dried at 80° C. for 13 minutes and then calendered at 60° C. The calendering was done using a unit from MTI Corporation at approximately 24 feet/minutes using a zero gap, and one pass at 60° C. The calendered samples were then further dried by heating at 120° C. for 16 hours under a vacuum of −27 to −30 inches of mercury. The importance of the final drying step is to dry the samples sufficiently to remove all of the residual solvent and the water, therefore the drying times, temperatures, and vacuum used can be adjusted to achieve this end result. The electrode slurry is dried to form an electrode material, generally an electrode layer adhered to the current collector, thereby forming a positive electrode. Other methods of coating the electrode slurry include rolling, spraying, draw bar application, gravure, slot coating, and other coil coating methods.

Samples of each electrode formulation prepared as described above were then subjected to a series of tests for functionality, electrical resistance, adhesion and resistance to electrolyte containing HF. Electrical resistance was tested in multiple areas for each sample using a fixed contact area and a fixed load, this test was performed on samples after they had been dried as described above and prior to exposure to any electrolyte solution. The electrolyte used in the following testing was a 1 Molar solution of $LiPF_6$ in a 1:1 weight ratio of ethylene carbonate and diethyl carbonate with an HF concentration of 250 ppm. Adhesion of the coated current collector was characterized following exposure to heated electrolyte (150 minutes @ 358° K) by measuring coating removed by 90° tape pull of Scotch brand adhesive tape #610 after removal of electrolyte. In addition, a fixed quantity of $LiMn_2O$ coated foils as described in Table 3 were immersed in a fixed volume of electrolyte and aged for 240 hours at the same elevated temperature, after which concentration of HF and manganese residues within the electrolyte was determined.

TABLE 4

| Test | Comparative Example $C_1$ | Example $G_1$ | Example $K_1$ |
|---|---|---|---|
| Electrical resistance (ohms/cm$^2$) prior to electrolyte exposure | 0.32 | 0.13 | 0.19 |
| Adhesion loss % | 100 | 30 | 0 |
| Concentration of HF (ppm) after 10 days exposure | 555 | ND | 702 |
| Electrolyte concentration of Mn (ppm) after 10 days exposure | 96 | ND | 83 |

The results show a number of significant benefits are provided by use of metal chelating polymers according to the present invention, even at the very low levels used. The control sample had a relatively high electrical resistance of 0.32 ohms/cm$^2$, by way of contrast the electrical resistances of the samples prepared according to the present invention were much lower. In the case of example $G_1$ the electrical resistance was only 40% of that found in the control sample, $C_1$, a very significant drop. Likewise the example $K_1$, prepared with polymer K, had an electrical resistance that was only 59% of that found in the control sample, $C_1$. These values are important because the lower the electrical resistance the better the active material is able to pass current and the more efficient the electrode functions. The adhesion of the samples prepared according to the present invention was also dramatically enhanced by the present invention. These results are quite striking given the results for the control samples. This much enhanced adhesion of the electrode material to the aluminum foil was unexpected, especially given that the metal chelating polymers were used at such low levels. The metal chelating polymers were present in an amount of 2.1% by weight based on the total weight of the non-solvent components of the electrode slurry. Finally, the measurement of the HF in the samples after 240 hours shows that there is a dramatic rise in HF over the test period. In addition, the data shows that despite having an even higher level of HF the adhesion of the polymer K was better by far than that of even polymer G according to the present invention. The amount of manganese dissolved in the electrolyte was also measured. Initially the electrolyte contained no manganese. After 240 hours of heated exposure, analysis of the electrolyte aged with the sample prepared using the control sample, $C_1$, showed 96 ppm Mn, while the electrolyte aged with the sample prepared using polymer K, example $K_1$, according to the present invention showed only 83 ppm Mn. The sole source of manganese was the electrode material containing $LiMn_2O_4$ active material and the aluminum foil used as current collector. Dissolution of either of these materials is undesirable. The reduction in dissolution of Mn into the electrolyte was an important performance benefit, where a major drawback of $LiMn_2O_4$ containing batteries is the drop in capacity over time because of the dissolution of the active material by the electrolyte.

Example B

Given the surprisingly good adhesion of the Example A samples prepared using inventive polymer K, in a next series of experiments polymer K was compared to a highly adhesive comparative polymer. The benefits of using a high adhesive value polymer binder not according to the present invention was compared to metal chelating polymer K according to the present invention, to determine if the results of polymer K could be attributed simply to better adhesion. In this next series of experiments the high adhesive value binder polyacrylonitrile, Example P, not a metal chelating polymer according to the present invention, was compared to a control sample, example $C_2$, and a sample prepared with metal chelating polymer K, example S. In addition, the level of polymer K in Example S was 75% less than the amount of polymer used in the previous experiments, see Table 3, Example $K_1$. Finally, an active material different from the Example A active material was used and two types of aluminum foil were tested as current collectors. The electrode slurries were prepared according to Table 5 in the order in which listed in the Table below, as described above for Example A slurry.

TABLE 5

| Component | Comparative Example $C_2$ (g) | Example S (g) | Comparative Example P (g) |
|---|---|---|---|
| Solvent (NMP) | 58.0 | 64.8 | 58.0 |
| Chelating polymer K | 0.0 | 0.3 | 0.0 |
| PVDF binder | 3.4 | 2.4 | 0.0 |
| Polyacrylonitrile binder | 0.0 | 0.0 | 3.4 |
| Carbon black | 3.4 | 2.9 | 3.4 |
| Active material ($LiCoO_2$) | 35.2 | 29.6 | 35.2 |

Each example slurry from Table 5 was then applied to two different types of aluminum foil, foil A and foil B, using a bird bar applicator having a gap width of 5 or 7.5 mils to result in a deposited dried weight amount of from 110 to 130 grams/meter$^2$ dried weight. Foil A was a pre-cleaned aluminum foil as described above for the first series of experiments. Foil B was an oily foil which is more typical of production run foils used in preparing electrodes for lithium ion batteries. The samples were then dried at 80° C. for 13 minutes and then calendered at 60° C. as described above for the first example. The importance of the final drying step is to dry the samples sufficiently to remove all of the residual solvent and the water, therefore the drying times, temperatures, and vacuum used can be adjusted to achieve this end result.

The samples were then tested for electrical resistance, adhesion and bend flexibility. Electrical resistance and adhesion were tested as described above.

The bend flexibility was tested as follows. A sample, freshly prepared, was bent over a test bend die of a given thickness to determine if the sample cracked and/or delaminated as a result of being bent over the bend die according to ASTM D4145-10. This test is directed toward determining the practical functionality of the electrodes since in use they need to be flexible enough to be formed into the desired final form in the storage device. In many batteries, a laminate of positive electrode, separator, and negative electrode is prepared and then this laminate is rolled on itself in a "jelly roll" form to be placed into a battery case. Thus, functional electrodes need to be flexible so they can be formed in the final battery embodiment. In the present experiments, a series of T bend dies were prepared from stock 0.03 inch thick panels per ASTM D4145-10. The test dies were a 0-fold bend die (meaning a flat unbent 0.03 inch thick panel), a 1-fold bend die being 1 fold of the panel thick, a 2-fold bend die being 2 folds of the panel thick, a 3-fold bend die being 3 folds of the panel thick, and a 4-fold bend die being 4 folds of the panel thick with conformal bending over 0 folds being the most severe test and 4 folds being the least severe. Rating was as follows: a rating of 00 for passing a bend test on the 0-fold bend die, a rating of 0 for passing a bend test on the 1-fold bend die, etc. The samples were tested starting with the least severe to most severe and the samples received a rating of 3, 2, 1, 0, or 00 respectively depending on which test bend die resulted in cracking and/or delamination as the foil was conformably bent around the various sized T-bends. A score of 00 represents a very flexible sample while a score of 3 represents a more inflexible sample.

The results of the tests are shown below in Tables 6 and 7. Table 6 shows the results from foil A, the pre-cleaned foil. In the data one can see that all three samples had essentially the same electrical resistance of 0.11 to 0.10 ohms/cm$^2$. The conventional electrode material, sample $C_2$, experienced a much larger loss of adhesion after exposure to electrolyte than did either sample S, with metal chelating polymer K according to the present invention, or sample P prepared with the high adhesive binder polyacrylonitrile not according to the present invention. The polymer K according to the present invention resulted in 40 times better adhesion in this test compared to the conventional electrode material with a conventional binder. The improvement of the present invention over the high adhesive binder polyacrylonitrile is shown in the bend flexibility test. Both the conventional electrode material and the electrode material prepared according to the present invention using polymer K had the highest flexibility ratings of 00, meaning they could be bent around the 0-fold bend die, corresponding to an unbent panel edge of 0.03 inches thick, without cracking or delaminating. In contrast, the high adhesive binder polyacrylonitrile had a poorer rating of 1 representing passing a bend test on the larger diameter 2-fold bend die. So the present invention allows for preparation of an electrode that has high resistance to hot electrolyte exposure and an excellent flexibility rating.

TABLE 6

| | Foil A | | |
|---|---|---|---|
| Test | Comparative Example $C_2$ | Example S | Comparative Example P |
| Contact resistance (ohms/cm$^2$) | 0.11 | 0.11 | 0.10 |
| Adhesion loss | 40% | 1% | 0% |
| Bend flexibility | 00 | 00 | 1 |

Table 7 shows the results from foil B, the oily non-cleaned foil. In the data one can see that all three samples had essentially the same electrical resistance of 0.10 to 0.08 ohms/cm$^2$. The conventional electrode material, sample $C_2$, experienced a total 100% loss of adhesion after exposure to electrolyte. The sample S made with metal chelating polymer K according to the present invention had a loss of 10%, meaning it was at least 10 times better than the conventional material in adhesion performance. Therefore even under manufacturing conditions the electrode material according to the present invention had far superior adhesion compared to the conventional material. Sample P prepared with the high adhesive binder polyacrylonitrile not according to the present invention still had no loss of adhesion after exposure to the electrolyte, however its flexibility performance was not as good as Sample S according to the invention. The value of the present invention over the high adhesive binder polyacrylonitrile is really seen in the bend flexibility test. Both the conventional material and the electrode material prepared according to the present invention using polymer K had the highest flexibility ratings of 00, meaning they could be bent around the 0-fold bend die corresponding to an unbent panel edge of 0.03 inches thick without cracking or delaminating. By way of contrast the high adhesive binder polyacrylonitrile, sample P, had a rating of 3 representing passing a bend test on the larger diameter 4-fold bend die. So the present invention allows for preparation of an electrode that has high resistance to electrolyte, and excellent flexibility rating.

TABLE 7

| | Foil B | | |
|---|---|---|---|
| Test | Comparative Example $C_2$ | Example S | Comparative Example P |
| Adhesion loss | 100% | 10% | 0% |
| Contact resistance (ohms/cm$^2$) | 0.10 | 0.08 | 0.09 |
| Bend flexibility | 00 | 00 | 3 |

The combined experimental results show that electrode materials prepared using the metal chelating polymers had far superior resistance to damage upon exposure to electrolyte, resistance to high levels of HF, excellent bending test flexibility, and low electrical resistance. The beneficial effects could not be duplicated merely by using a high adhesive binder like polyacrylonitrile. The metal chelating polymers were effective with a variety of active material compositions.

In another embodiment, the present invention can comprise an electrode material intermediate as described in Table 8 for forming into an electrode material by addition of an electrode active material. The electrode material intermediate comprises: at least one metal chelating comprising a reaction product of a polyphenolic polymer; an aldehyde, a ketone, or mixtures thereof; and an amine, the metal chelating polymer capable of chelating and binding to a metal; a plurality of electrical conductor particles; and a binder polymer. These three components are as described above, the intermediate can also include minor amounts of crosslink catalysts for the binder polymers, biocides, wetting agents, and dispersing agents. The inventive electrode material intermediate shows good adhesion following exposure to electrolytes and heat, has very low impedance, high resistance to chemicals, high electrochemical stability, and can be used in thin and ultrathin applications. The intermediate can be used in coating thicknesses of from 0.1 to 25 g/m$^2$, more preferably from 0.1 to 1 g/m$^2$. These thin coatings can be dried very rapidly, preferably at 400° F. in 30 seconds to 24 hours, more preferably in 60 seconds to 60 minutes. A series of these electrode material intermediates were prepared using the metal chelating polymer G from above. Again, polymer G comprises as component A poly (4-hydroxystyrene), paraformaldehyde as component B, and N-methylethanolamine as component C. The methods of formation of examples 1-9, made in accordance with the present invention, and comparative examples 10 and 11 not in accordance with the present invention are given below.

Electrode Material Intermediate Examples

Example 1

The example 1 electrode material intermediate was prepared by combining: 2.52 g of a polymer G stock solution, 8.46 g of a poly(methyl methacrylate) (PMMA) stock solution, and 13.76 g of a pigment paste. The combination was then reduced to 9% by weight solids using the solvent NMP prior to use on substrates. The polymer G stock solution was prepared as follows. An amount of 265 g of polymer G was added to 1000 ml of deionized water, mixed and then decanted. The polymer was then collected using a spatula. Then 29.42 g of the recovered polymer G was dissolved in 69.92 g of NMP to give the polymer G stock solution. The PMMA stock solution was prepared by combining 7.03 g of acrylic methacrylate copolymer, with 47.85 g of NMP. The mixture was heated to 65° C. in a sealed glass bottle to dissolve the PMMA. The PMMA solution was cooled prior to use. The pigment paste was prepared as follows. An amount of 188.11 g of NMP was added to a stainless steel vessel. While mixing with a 1.625" cowls/sawblade impeller at 750 rpm the following were added: 2.9 g of a polyvinylpyrrolidone of average MW 10,000; 42.86 g of an electrically conductive synthetic graphite powder with 99% of particles <75 microns; and 14.36 g of carbon black XC72 pellets from Cabot. The combination was mixed for 60 minutes. The mixture was then transferred to a 500 ml high density polyethylene (HDPE) bottle and combined with 350 ml of Zirconox® 1.8 mm milling bead media, the combination was processed in a shaker mill for 1.75 hours to form the pigment paste. The Zirconox® media is from Jyoti Ceramic Industries and it is a form of ceramic micro milling beads, in all examples of the present specification after the milling step the milling beads were removed and recovered by filtering the paste through a stainless steel mesh to isolate the beads from the final pigment paste.

Example 2

The example 2 electrode material intermediate was prepared by combining: 2.54 g of the polymer G stock solution prepared as described in example 1, 8.46 g of PMMA stock solution prepared as described in example 1, 13.499 g of a pigment paste, and 28.498 g of a nanotube pigment paste. The combination was then reduced to 9% by weight solids using the solvent NMP prior to use on substrates. The pigment paste was prepared as follows. In a stainless steel vessel 202.3 g of NMP was mixed with a 1.625" cowls/sawblade impeller at 750 rpm. To the vessel the following were added: 2.21 g of a polyvinylpyrrolidone of average MW 10,000; 32.68 g of an electrically conductive synthetic graphite powder with 99% of particles <75 microns; and 10.875 g of carbon black XC72 pellets. The combination was mixed for 60 minutes. The mixture was then transferred to a 500 ml HDPE bottle and combined with 350 ml of Zirconox® 1.8 mm milling bead media, the combination was processed in a shaker mill for 1.75 hours. The nanotube pigment paste was prepared as follows. In a stainless steel vessel 212 g of NMP was mixed with a 1.625" cowls/sawblade impeller at 1500 rpm. To the vessel the following were added: 23.5 g of a 12% by weight solution of carbon nanotubes in NMP solvent, was added in four portions with mixing for 10 minutes between each addition. The mixture was then transferred to a 500 ml HDPE bottle and combined with 350 ml of Zirconox® 1.8 mm milling bead media, the combination was processed in a shaker mill for 1.25 hours to form the nanotube pigment paste, which was isolated from the beads as described above.

Example 3

The example 3 electrode material intermediate was prepared by first combining 11.68 g of a stock solution of 10.786 g of polymer G dissolved in 71.842 g of NMP, 1.085 g of acrylic methacrylate copolymer, and 13.8 g of the pigment paste from example 1 to form a bulk formula. Then 25.142 g of the bulk formula was combined with 9.1 g of 1-propanol to form example 3.

Example 4

The example 4 electrode material intermediate was prepared by first combining 11.69 g of the stock solution of polymer G from example 3, 1.086 g of acrylic methacrylate copolymer, and 19.1 g of the pigment paste from example 1 to form a bulk formula. Then 30.457 g of the bulk formula was combined with 11.7 g of 1-propanol to form example 4.

Example 5

The example 5 electrode material intermediate was prepared by first combining 25.097 g of the stock solution of polymer G from example 3, 1.09 g of acrylic methacrylate copolymer, 16.0 g of the pigment paste from example 1, and 20.0 g of the nanotube pigment paste from example 2 to form a bulk formula. Then 47.271 g of the bulk formula was combined with 6.0 g of 1-propanol to form example 5.

Example 6

The example 6 electrode material intermediate was prepared by combining: 1.52 g of a stock solution of polymer G prepared by combining 39.10 g of Polymer G with 60.119 g of NMP with stirring to dissolve; 9.406 g of an acrylic methacrylate copolymer stock solution prepared by combining 19.244 g of acrylic methacrylate copolymer into 72.32 g of NMP in a glass bottle, the bottle was sealed and placed in an oven at 60° C. to dissolve the acrylic methacrylate copolymer, and then cooled prior to use; 9.35 g of a pigment paste prepared by adding 142.5 g of NMP into a stainless steel vessel, while mixing at 500 rpm with a 1.625" Cowles/sawblade impeller 9.5 g of polymer G was added, then 42.8 g of an electrically conductive synthetic graphite powder with 99% of particles <75 microns and 14.3 g of carbon black XC72 pellets were added while mixing, the speed was then increased to 1300 rpm and held there for one hour, the mixture was then transferred to a 500 ml HDPE bottle with 350 ml of Zirconox® 1.8 mm milling bead media and processed in a shaker mill for 1.75 hours to form the pigment paste; and 7.2 g of 1-propanol to form example 6.

Example 7

The example 7 electrode material intermediate was prepared by combining: 1.504 g of the stock solution of polymer G prepared as in example 6; 9.45 g of the acrylic methacrylate copolymer stock solution prepared as in example 6; 8.21 g of the pigment paste prepared according to example 6; 10.23 g of a nanotube pigment paste prepared by adding 160 g of NMP into a stainless steel vessel, while mixing at 500 rpm 16 g of a 12% by weight solution of carbon nanotubes in NMP solvent were added, then the speed was increased to 800 rpm and 16 g of. The carbon nanotubes were added, then the speed was increased to 1700 rpm and 16 g of. The carbon nanotubes were added, the speed was increased to 2000 rpm and 16 g of. The carbon nanotubes were added, the speed was held at 2000 rpm for one hour, then the contents of the stainless steel vessel were transferred to a 500 ml HDPE bottle with 350 ml Zirconox® 1.8 mm milling bead media and processed in a shaker mill for 1.25 hours to form the nanotube pigment paste; and 3.85 g of 1-propanol to form example 7.

Example 8

The example 8 electrode material intermediate was prepared by combining: 4.54 g of the stock solution of polymer G prepared as in example 6; 9.43 g of the acrylic methacrylate copolymer stock solution prepared as in example 6; 8.18 g of the pigment paste prepared according to example 6; 11.18 g of the nanotube pigment paste prepared according to example 7; and 4.4 g of 1-propanol to form example 8.

Example 9

The example 9 electrode material intermediate was prepared by combining: 4.9 g of the stock solution of polymer G described below; 16.8 g of a 12% solution of polyvinylidene difluoride (PVDF) in NMP; and 27.5 g of a pigment paste prepared as described below. After formation of the intermediate the solids were reduced to a level of 9% by weight solids with NMP prior to use on substrates. The stock solution of polymer G was prepared by adding 265 g of polymer G to 1000 ml of deionized water with mixing, the polymer was decanted then the polymer G was collected with a spatula. Then 30.572 g of the recovered polymer G was dissolved in 69.1 g of NMP to give the stock solution of polymer G. The pigment paste was prepared by adding 202.1 g of NMP into a stainless steel vessel. While mixing with a 1.625" Cowles/sawblade impeller at 750 rpm the following were added: 5.99 g of a polyvinylpyrrolidone of average MW 10,000, 30.08 g of an electrically conductive synthetic graphite powder with 99% of particles <75 microns, and 10.04 g of XC72 carbon black pellets. After 1 hour of mixing, the contents were transferred to a 500 ml HDPE bottle with 350 ml Zirconox® 1.8 mm milling bead media and processed in a shaker mill for 1.75 hours to form the pigment paste.

Control Example 10

Control example 10 was a PMMA binder control example that included no metal chelating polymer. It was prepared by combining the following: 3.80 g of an acrylic methacrylate copolymer stock solution prepared as described below; 16.28 g of a pigment paste prepared as described below; and 24.00 g of NMP. The example 10 mixture was then diluted to 9% by weight solids with NMP prior to use on substrates. The acrylic methacrylate copolymerstock solution was prepared by adding 27.4 g of acrylic methacrylate copolymer into 76.7 g of NMP with mixing. The mixture was heated to 100° C. to dissolve the acrylic methacrylate copolymer, the solution was cooled before use. The pigment paste was prepared as follows. An amount of 201.9 g of NMP was added to a stainless steel vessel. While mixing at 750 rpm with a 1.625" Cowles/sawblade impeller the following were added: 6.0 g of a polyvinylpyrrolidone of average MW 10,000, 30.0 g of an electrically conductive synthetic graphite powder with 99% of particles <75 microns, and 10.1 g carbon black XC72 pellets. The contents were then transferred to a 500 ml HDPE bottle with 350 ml Zirconox® 1.8 mm milling bead media and processed in a shaker mill for 1.75 hours to form the pigment paste.

Control Example 11

Control example 11 was a PVDF binder control example that included no metal chelating polymer. It was prepared by combining the following: 8.33 g of a 12% by weight solution of polyvinyl fluoride in NMP; 16.28 g of the pigment paste prepared as in example 10; and 19.39 g of NMP. The example 11 mixture was then diluted to 9% by weight solids with NMP prior to use on substrates.

Testing of Examples 1-9 & Control Examples 10 & 11

To test the adhesion of the electrode material intermediates described above in the presence of electrolytes a series of tests were performed and the results are presented below. The samples were applied to pre-cleaned aluminum foil pieces using a drawbar and applied as very thin coatings ranging from 0.15 to 0.3 g/m$^2$. The coatings were dried at 400° F. for 60 seconds. Adhesion was characterized as described before. Results for examples 1-9 according to the present invention and control examples 10 and 11 not according to the present invention are given below in Table 8. The results show that even in very thin coatings of from 0.15 to –0.30 g/m$^2$ the electrode material intermediates had very high adhesion to the aluminum substrate. The losses following heated electrolyte exposure was never more than 1% and in many cases there was no loss. This was true for examples 1-8 which included a PMMA binder component as well as for example 9 which used a PVDF binder component. By way of contrast, example 10, a control example not in accordance with the present invention, which included the binder PMMA, lost 60% adhesion. Similarly, example 11, a control example not in accordance with the present invention, which included the binder PVDF, lost 25% adhesion. In summary, the electrode material intermediates in accordance with the present invention had over 25 to 60 times better adhesion in the presence of electrolyte than did control examples not including the metal chelating polymer.

TABLE 8

| Example # | Metal chelating polymer G % by weight in dried coating | Coating weight g/m$^2$ | Adhesion test % lost |
|---|---|---|---|
| 1 | 9 | 0.3 | 1 |
| 1 | 9 | 0.15 | 0 |
| 2 | 9 | 0.3 | 1 |
| 2 | 9 | 0.15 | 1 |
| 3 | 9 | 0.3 | 0 |
| 4 | 7 | 0.3 | 0 |
| 5 | 15 | 0.3 | 0 |
| 6 | 8 | 0.3 | 1 |
| 7 | 8 | 0.3 | 1 |
| 8 | 16 | 0.3 | 1 |
| 9 | 11 | 0.3 | 0 |
| 9 | 11 | 0.15 | 0 |
| 10 | 0 | 0.3 | 60 |
| 11 | 0 | 0.3 | 25 |

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A non-aqueous electrode material for a lithium ion electrical storage device comprising:
   at least one metal chelating polymer comprising a reaction product of a polyphenolic polymer; an aldehyde, a ketone, or mixtures thereof; and a secondary amine, said metal chelating polymer having amine functionality and being capable of chelating and binding to a metal;
   an active material capable of reversibly intercalating lithium ions, selected from the group consisting of LiCoO$_2$, LiMn$_2$O$_4$, LiNiMnCoO$_2$, LiNiCoAlO$_2$, Li$_4$Ti$_{15}$O$_{12}$, LiFePO$_4$ and combinations thereof;
   a plurality of electrical conductor particles; and
   a binder polymer, different from the metal chelating polymer; wherein all Li is sourced from said active material and the non-aqueous electrode material is capable of forming an electrode layer adhered to a current collector upon drying.

2. The non-aqueous electrode material of claim 1, wherein said amine comprises at least one of methylethylamine, dimethylamine, diethylamine, diethanolamine, methylethanolamine, dipropylamine, di-n-butylamine, diisoamylamine, dibenzylamine, methyldiethylethylenediamine, methylaniline, piperidine, 1,2,3,4-tetrahydroisoquinoline, 6-methoxy-1,2,3,4-tetrahydroisoquinoline, morpholine, piperazine, α-methylaminopropiophenone, α-acetylethylbenzylamine; benzyl-(2-cyclohexanonylmethyl)-amine, 3,4-methylenedioxybenzyl-(2-cyclohexanonylmethyl)-amine, N-methylglucamine, glucosamine, t-butylamine; a C$_1$ to C$_{12}$ alkyl amine; and mixtures thereof.

3. The non-aqueous electrode material of claim 1 wherein said polyphenolic polymer is a poly(4-vinylphenol).

4. The non-aqueous electrode material of claim 1 wherein said aldehyde is paraformaldehyde.

5. The non-aqueous electrode material of claim 1 further comprising a non-aqueous solvent comprising at least one of N-methyl-2-pyrrolidone (NMP), N,N dimethylformamide (DMF), N,N diethylformamide (DEF), dimethyl sulfoxide (DMSO), tetrahydrofuran (THF) and mixtures thereof.

6. The non-aqueous electrode material of claim 1 wherein said active material comprises at least one of LiMn$_2$O$_4$, LiNiMnCoO$_2$, and combinations thereof; wherein said electrical conductor particles comprise at least one of carbon black, graphite, graphene, and carbon nanoparticles.

7. The non-aqueous electrode material of claim 1 wherein said binder polymer comprises at least one of polyvinylidene difluoride, poly(methyl methacrylate) (PMMA), polyacrylonitrile (PAN), styrene butadiene rubber (SBR), polytetrafluoroethylene (PTFE), a styrene butadiene rubber (SBR) and polytetrafluoroethylene (PTFE) copolymer, a carboxymethyl cellulose (CMC), a hydroxylpropyl methyl cellulose (HPMC), a methyl cellulose (MC), a polyacrylic acid sodium (PAAS), and a mixture thereof.

8. The non-aqueous electrode material of claim 1 in a layer applied and dried to a current collector for a positive electrode of said electrical storage device.

9. A method of making a positive electrode for a lithium ion electrical storage device comprising steps of:
   applying a slurry of the non-aqueous electrode material of claim 1 to at least one surface of a current collector to form a layer;
   drying the slurry to the current collector, to bind the non-aqueous electrode material to the current collector, thereby forming a positive electrode layer adhered to the current collector.

10. The method of claim 9 wherein said electrode material is deposited in an amount to result in a coating of from 50 to 250 grams/meter$^2$ when dried in place on said current collector.

11. A positive electrode for a lithium ion electrical storage device comprising:

a current collector; and adhered to at least one surface of said current collector the non-aqueous electrode material of claim 1.

12. A non-aqueous electrode material intermediate for a lithium ion electrical storage device comprising:
- at least one metal chelating polymer comprising a reaction product of a polyphenolic polymer; an aldehyde, a ketone, or mixtures thereof; and an amine, said metal chelating polymer having amine functionality and being capable of chelating and binding to a metal;
- a plurality of electrical conductor particles; and
- a binder polymer, different from the metal chelating polymer, in the absence an active material.

13. The non-aqueous electrode material intermediate of claim 12, wherein said polyphenolic polymer is a poly(4-vinylphenol); and said amine comprises at least one of methylethylamine, dimethylamine, diethylamine, diethanolamine, methylethanolamine, dipropylamine, di-n-butylamine, diisoamylamine, dibenzylamine, methyldiethylethylenediamine, methylaniline, piperidine, 1,2,3,4-tetrahydroisoquinoline, 6-methoxy-1,2,3,4-tetrahydroisoquinoline, morpholine, piperazine, α-methylaminopropiophenone, α-acetylethylbenzyl amine; benzyl-(2-cyclohexanonylmethyl)-amine, 3,4-methylenedioxybenzyl-(2-cyclohexanonylmethyl)-amine, N-methyl-glucamine, glucosamine, t-butylamine; a $C_1$ to $C_{12}$ alkyl amine; and mixtures thereof.

14. The non-aqueous electrode material intermediate of claim 12 wherein said polyphenolic polymer comprises poly(4-hydroxystyrene) and the aldehyde comprises paraformaldehyde.

15. The non-aqueous electrode material intermediate of claim 12 further comprising a non-aqueous solvent comprising at least one of N-methyl-2-pyrrolidone (NMP), N,N dimethylformamide (DMF), N,N diethylformamide (DEF), dimethyl sulfoxide (DMSO), tetrahydrofuran (THF) and mixtures thereof.

16. The non-aqueous electrode material intermediate of claim 12 wherein said binder polymer comprises at least one of polyvinylidene difluoride, poly(methyl methacrylate) (PMMA), polyacrylonitrile (PAN), styrene butadiene rubber (SBR), polytetrafluoroethylene (PTFE), a styrene butadiene rubber (SBR) and polytetrafluoroethylene (PTFE) copolymer, a carboxymethyl cellulose (CMC), a hydroxylpropyl methyl cellulose (HPMC), a methyl cellulose (MC), a polyacrylic acid sodium (PAAS), and a mixture thereof.

17. The non-aqueous electrode material intermediate of claim 12 wherein said at least one metal chelating polymer is present in an amount of from 7 to 16 percent by weight based on the total weight of all the components of the electrode material intermediate.

18. The non-aqueous electrode material intermediate of claim 12 in a layer applied and dried to a current collector for a positive electrode of said electrical storage device.

19. A non-aqueous electrode material for a lithium ion electrical storage device comprising:
- 0.1-15 wt. %, based on total dried weight of the non-aqueous electrode material, of at least one metal chelating polymer that is a reaction product of poly(4-hydroxystyrene); an aldehyde, a ketone, or mixtures thereof; and N-methyl glucamine and/or N-methyl ethanolamine, said metal chelating polymer having amine functionality and being capable of chelating and binding to a metal;
- an active material comprising manganese and capable of reversibly intercalating lithium ions;
- a plurality of electrical conductor particles; and
- a binder polymer selected from the group consisting of polyvinylidene difluoride, poly(methyl methacrylate) (PMMA), polyacrylonitrile (PAN), styrene butadiene rubber (SBR), polytetrafluoroethylene (PTFE), a styrene butadiene rubber (SBR) and polytetrafluoroethylene (PTFE) copolymer, a carboxymethyl cellulose (CMC), a hydroxylpropyl methyl cellulose (HPMC), a methyl cellulose (MC), a polyacrylic acid sodium (PAAS), and mixtures thereof;
- wherein the non-aqueous electrode material contains no electrolyte.

* * * * *